United States Patent
Molla et al.

(10) Patent No.: US 12,222,002 B1
(45) Date of Patent: Feb. 11, 2025

(54) SYSTEMS AND METHODS FOR BEARING LUBRICATION

(71) Applicant: Saudi Arabian Oil Company, Dhahran (SA)

(72) Inventors: Hasanur Jamal Molla, Dhahran (SA); Hadi A. Al-Qahtani, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/446,574

(22) Filed: Aug. 9, 2023

(51) Int. Cl.
- *F16C 33/10* (2006.01)
- *F16N 1/00* (2006.01)
- *F16N 13/20* (2006.01)

(52) U.S. Cl.
CPC .......... *F16C 33/1045* (2013.01); *F16N 1/00* (2013.01); *F16N 13/20* (2013.01); *F16N 2210/14* (2013.01)

(58) Field of Classification Search
CPC ........ F16C 33/1045; F16N 1/00; F16N 13/20; F16N 2210/14; F16N 7/40; F16N 7/14
USPC ............................................................ 184/6
See application file for complete search history.

(56) References Cited

U.S. PATENT DOCUMENTS

| | | | | |
|---|---|---|---|---|
| 3,458,011 | A * | 7/1969 | Dwyer | F04B 39/02 184/6 |
| 7,506,724 | B2 * | 3/2009 | Delaloye | F01D 25/18 184/6.4 |
| 9,353,849 | B2 * | 5/2016 | Uusitalo | F16H 57/0435 |
| 11,293,448 | B1 * | 4/2022 | Zhang | F04D 29/063 |
| 2011/0303491 | A1 * | 12/2011 | Jenkins | F16C 17/20 184/7.4 |
| 2021/0332854 | A1 * | 10/2021 | Snell | G01K 3/08 |

FOREIGN PATENT DOCUMENTS

CN    115106823 A    9/2022

OTHER PUBLICATIONS

Wang et al., "On-line Monitoring Method of Bearing in Rotating Machinery Based on Wireless Sensor Networks", Advances in Engineering Research, vol. 120, pp. 564-571, 2017.

* cited by examiner

*Primary Examiner* — Michael R Mansen
*Assistant Examiner* — Mark K Buse
(74) *Attorney, Agent, or Firm* — DINSMORE & SHOHL LLP

(57) ABSTRACT

A system for bearing lubrication comprises a bearing; a temperature sensor; a pressure sensor; a lubricant reservoir; a bearing lubrication comprising a pump; a lubricant drainage line; an exhaust fan; and a bearing lubrication controller communicatively coupled to the temperature sensor, the pressure sensor, the pump, and the exhaust fan, wherein the bearing lubrication controller is programmed to execute bearing temperature control logic comprising detecting the temperature from the temperature sensor, determining whether the temperature falls outside an upper pre-defined bound of the temperature, increasing the rate of a lubricant supplied from the pump to the bearing, detecting the fluid pressure from the pressure sensor, determining whether the fluid pressure falls outside an upper pre-defined bound of the fluid pressure within the bearing, and increasing the speed of the exhaust fan to increase a pressure differential along the lubricant drainage line from the bearing to the lubricant reservoir.

20 Claims, 3 Drawing Sheets

SYSTEMS AND METHODS FOR BEARING LUBRICATION

TECHNICAL FIELD

Embodiments herein generally relate to systems and processes for bearing lubrication, and particularly to systems and processes in forced lubrication systems for maintaining temperature in bearings utilizing bearing temperature control logic.

BACKGROUND

Rotating equipment are equipped with bearings to carry the load of the equipment as well as maintaining the equipment in a central position. Some types of rotating equipment, such as, but not limited to turbines, are also equipped with a forced lubrication system for bearing lubrication to prevent overheating and damage to the bearing during operation by supplying adequate amount of lubricating oil to the bearing.

BRIEF SUMMARY

However, without adequate supply of lubricating oil to the bearing, overheating may still occur. For example, rotating equipment may be under varying degrees of load during operation, such that the radial/axial load borne by the bearing, and thus the cooling/lubrication demands of the forced lubrication system, may be heightened. Further, during high demand situations, there may be localized areas of higher temperature within the bearing, reducing the useful life of the lubricant according to the Arrhenius law if fresh lubricant is not supplied at the necessary rate. Further, forced lubrication systems are also often supplied with an orifice plate to control the rate of lubricant flow. However, mishandling, improper sizing, and plugging of restricted orifice plates may result in bearing failure where increased lubricant flow is desired.

Accordingly, systems of methods of bearing lubrication are desired that may monitor and maintain bearing temperature over time at suitable levels where overheating of the bearing or lubricant is reduced. Consequently, described herein are systems and methods for bearing lubrication that accomplish the aforementioned by utilizing bearing temperature control logic. Particularly, a bearing lubrication controller can monitor a temperature within the bearing, making adjustments to the rate of lubricant supply to the bearing if the temperature exceeds a pre-defined bound. Further, the bearing lubrication controller can also monitor and address potential over-pressuring inside the bearing housing, such as by improper lubricant drainage or blockage, such as blockage of lubricant drainage lines/vents, by monitoring a fluid pressure inside the bearing housing. Upon determining the fluid pressure falls outside the pre-defined pressure bounds of the bearing, the bearing lubrication controller may make adjustments to an exhaust fan speed, increasing a pressure differential from the bearing to the lubricant reservoir and thereby increasing drainage. Further, methods and systems herein may accomplish the aforementioned without the need for a orifice plate, increasing the broader applicability of the same.

In accordance with one embodiment of the present disclosure, a system for bearing lubrication comprises a bearing; a temperature sensor configured to sense a temperature within the bearing; a pressure sensor configured to sense a fluid pressure within the bearing; a lubricant reservoir comprising a lubricant; a bearing lubrication line fluidly connected downstream from the lubricant reservoir and upstream from the bearing, the bearing lubrication line comprising a pump configured to supply the lubricant from the lubricant reservoir to the bearing along the bearing lubrication line; a lubricant drainage line fluidly connected downstream from the bearing and upstream from the lubricant reservoir, the lubricant drainage line configured to supply the lubricant from the bearing back to the lubricant reservoir along the lubricant drainage line; an exhaust fan fluidly connected to the lubricant reservoir, the exhaust fan configured to remove gaseous fluid from the lubricant reservoir; and a bearing lubrication controller communicatively coupled to the temperature sensor, the pressure sensor, the pump, and the exhaust fan.

Wherein, in the previous embodiment, the bearing lubrication controller is programmed to execute bearing temperature control logic comprising detecting the temperature from the temperature sensor, receiving the temperature from the temperature sensor, determining whether the temperature falls outside an upper pre-defined bound of the temperature, increasing the rate of the lubricant supplied from the pump to the bearing upon determining the temperature falls outside the upper pre-defined bound of the temperature, detecting the fluid pressure from the pressure sensor after increasing the rate of lubricant, receiving the fluid pressure from the pressure sensor, determining whether the fluid pressure falls outside an upper pre-defined bound of the fluid pressure within the bearing, and increasing the speed of the exhaust fan to increase a pressure differential along the lubricant drainage line from the bearing to the lubricant reservoir upon determining the fluid pressure falls outside the upper pre-defined bound of the fluid pressure within the bearing.

In accordance with another embodiment of the present disclosure, a process for bearing lubrication utilizing bearing temperature control logic comprises detecting the temperature from the temperature sensor, receiving the temperature from the temperature sensor, determining whether the temperature falls outside an upper pre-defined bound of the temperature, increasing the rate of the lubricant supplied from the pump to the bearing upon determining the temperature falls outside the upper pre-defined bound of the temperature, detecting the fluid pressure from the pressure sensor after increasing the rate of lubricant, receiving the fluid pressure from the pressure sensor, determining whether the fluid pressure falls outside an upper pre-defined bound of the fluid pressure within the bearing, and increasing the speed of the exhaust fan to increase a pressure differential along the lubricant drainage line from the bearing to the lubricant reservoir upon determining the fluid pressure falls outside the upper pre-defined bound of the fluid pressure within the bearing.

Wherein, in the previous embodiment, a temperature sensor and a pressure sensor are configured, respectively, to sense a temperature and a fluid pressure within a bearing; an exhaust fan is fluidly connected to a lubricant reservoir and is configured to remove gaseous fluid from the lubricant reservoir; a bearing lubrication line is fluidly connected downstream from the lubricant reservoir and upstream from the bearing, the bearing lubrication line comprising a pump configured to supply a lubricant from the lubricant reservoir to the bearing along the bearing lubrication line; a lubricant drainage line is fluidly connected downstream from the bearing and upstream from the lubricant reservoir, the lubricant drainage line configured to supply the lubricant from the bearing back to the lubricant reservoir along the lubricant drainage line; a bearing lubrication controller is communicatively coupled to the temperature sensor, the pressure sensor, the pump, and the exhaust fan and is programmed to execute a process utilizing bearing temperature control logic.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
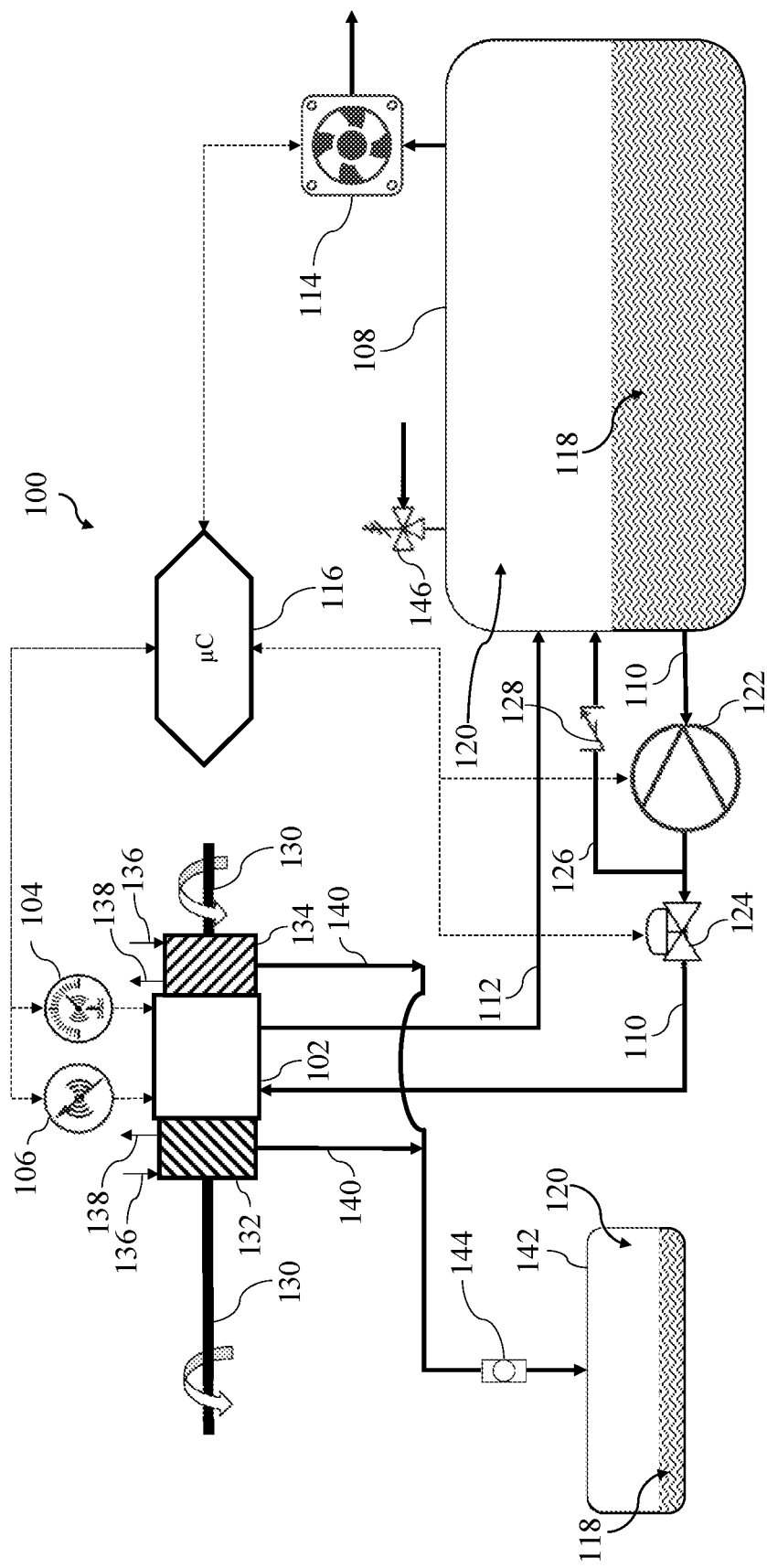
FIG. 1 illustrates a system for bearing lubrication utilizing bearing temperature control logic, according to embodiments herein.

Referring initially to FIG. 1, a system 100 for bearing lubrication comprises a bearing 102, a temperature sensor 104, a pressure sensor 106, a lubricant reservoir 108, a bearing lubrication line 110, a lubricant drainage line 112, an exhaust fan 114, and a bearing lubrication controller 116. The temperature sensor 104 may be configured to sense a temperature within the bearing 102. The pressure sensor 106 may be configured to sense a fluid pressure within the bearing 102. The lubricant reservoir 108 may comprise a lubricant 118, gaseous fluid 120, or both. The system may also not comprise an orifice plate.

Still referring to FIG. 1, the system 100 may comprise the bearing 102, as well as a rotary member 130 in contact with the bearing 102. Without being limited by theory, while the rotary member 130 is illustrated in FIG. 1 to rotate in a counter-clockwise manner, the rotary member 130 may also rotate in a clockwise manner. The bearing 102 may also comprise an inboard seal 132 and an outboard seal 134. The inboard seal 132 and the outboard seal 134 may be configured to form a positive pressure seal on the bearing 102 and the rotary member 130. Particularly, the system 100 may further comprise a compressed air source (not illustrated) and an air supply line 136, the air supply line 136 fluidly connected downstream of the compressed air source and upstream of at least one of the inboard seal 132 and the outboard seal 134. The compressed air source may be configured to supply compressed air to at least one of the inboard seal 132 and the outboard seal 134 through the air supply line 136 to generate the positive pressure on the bearing 102, the rotary member 130, or both. Similarly, the system 100 may also comprise an air vent line 138, which may be configured to vent the compressed air from at least one of the inboard seal 132 and the outboard seal 134, such as when the bearing 102, the rotary member 130, or both need to undergo routine maintenance or replacement.

Without being limited by theory, it is contemplated that some of the lubricant 118 may intrude into the inboard seal 132, the outboard seal 134, or both. Accordingly the system 100 may further comprise a seal drainage line 140 fluidly coupled to and downstream from the inboard seal 132, the outboard seal 134, or both. The seal drainage line 140 may be configured to supply the lubricant 118 that intrudes into the inboard seal 132, the outboard seal 134, or both to a disposal tank 142 downstream of the seal drainage line 140.

To assess the quantity of the lubricant 118 that is intruding into the inboard seal 132, the outboard seal 134, or both (and determine if one or both needs routine maintenance or repair), a sight glass 144 may be positioned upstream of the disposal tank 142 and within the seal drainage line 140.

Still referring to FIG. 1, the system 100 may comprise the bearing lubrication line 110. As illustrated in FIG. 1, the bearing lubrication line 110 may be fluidly connected upstream from the bearing 102 and downstream from the lubricant reservoir 108. The bearing lubrication line 110 may also comprise a pump 122 configured to supply the lubricant 118 from the lubricant reservoir 108 to the bearing 102 along the bearing lubrication line 110. In embodiments, the bearing lubrication line 110 may further comprise a control valve 124 positioned downstream of the pump 122 and upstream of the bearing 102. The control valve 124 may be configured to variably open or close, controlling the flow of the lubricant 118 from the pump 122, as described in further detail hereinbelow.

Still referring to FIG. 1, the system 100 may further comprise a pressure release line 126 fluidly coupled to the bearing lubrication line 110 and the lubricant reservoir 108. The pressure release line 126 may be positioned downstream of the pump 122 and upstream of the control valve 124. The pressure release line 126 may also comprise a check valve 128.

Still referring to FIG. 1, the system 100 may comprise the lubricant drainage line 112. The lubricant drainage line 112 may be fluidly connected downstream from the bearing 102 and upstream from the lubricant reservoir 108, the lubricant drainage line 112 configured to supply the lubricant 118 from the bearing 102 back to the lubricant reservoir 108 along the lubricant drainage line 112. As previously stated, the system 100 may comprise the lubricant reservoir 108. The lubricant reservoir 108 may be at a lower elevation than the bearing 102. Without being limited by theory, the lubricant reservoir 108 being at a lower elevation than the bearing 102 may enhance the drainage along the lubricant drainage line 112 as the lubricant 118 may drain utilizing gravity drainage.

Still referring to FIG. 1, the system 100 may comprise the exhaust fan 114. The exhaust fan 114 may be fluidly connected to the lubricant reservoir 108. The exhaust fan 114 may be a variable speed drive motor, such that the speed of the exhaust fan 114 may be adjustable, as explained in further detail hereinbelow. The exhaust fan 114 may also be configured to remove the gaseous fluid 120 from the lubricant reservoir 108. Also as illustrated in FIG. 1, the lubricant reservoir 108 may further comprise a breather valve 146.

Still referring to FIG. 1, and as previously stated, the system 100 may comprise the bearing lubrication controller 116, which may be programmed to execute bearing temperature control logic. The bearing lubrication controller 116 may be communicatively coupled to the temperature sensor 104, the pressure sensor 106, the pump 122, control valve 124, and the exhaust fan 114.

For direct communication, it is contemplated that the temperature sensor 104, the pressure sensor 106, the pump 122, control valve 124, and the exhaust fan 114 may comprise a two-way data communications link connecting communications hardware of the same to communications hardware of the bearing lubrication controller 116. The bearing lubrication controller 116 may comprise a microcontroller unit, or it may comprise multiple or sub-microcontroller units. The microcontroller unit may comprise a processor communicatively coupled to the memory. The communications hardware of the microcontroller unit may receive data, comprising the temperature, the fluid pressure, or both, and transfer the data to be stored in the memory. The processor may be configured to pull the data from the memory, conduct one or more operations on the data according to the bearing temperature control logic, which may also be stored on the memory, before communicating instructions to the pump 122, the control valve 124, the exhaust fan 114 or combinations thereof.

The bearing temperature control logic may comprise detecting the temperature from the temperature sensor 104, receiving the temperature from the temperature sensor 104, and determining whether the temperature falls outside pre-defined bounds of the temperature. The pre-defined bounds of the temperature may comprise an upper pre-defined temperature bound and a lower pre-defined temperature bound. The pre-defined bounds of the temperature may themselves be determined according to the experience of personnel, temperature ratings for the bearing 102, temperature ratings for the lubricant 118, temperature ratings for the lines used in the system 100, operational safety, or combinations thereof.

Referring again to the bearing temperature control logic, the logic may further comprise increasing the rate of the lubricant 118 supplied from the pump 122 to the bearing 102, such as through adjustment of the control valve 124, upon determining the temperature falls outside the upper pre-defined bound of the temperature. Without being limited by theory, increasing the rate of the lubricant 118 supplied from the pump 122, such as through adjustment of the control valve 124, may operate to cool the bearing 102. Similarly, if the temperature falls outside the lower pre-defined bound of the temperature, the logic may further comprise decreasing the rate of the lubricant 118 supplied from the pump 122, such as through adjustment of the control valve 124, to the bearing 102, as the additional load on the pump 122 may not be necessary to ensure adequate lubrication and cooling of the bearing 102. If the temperature falls inside the pre-defined bounds of the temperature, one or more additional iterations of the logic occur wherein additional temperatures are detected and received before conducting the determining step in each subsequent iteration.

In embodiments including the control valve 124, the rate of lubricant 118 supplied from the pump 122 may be increased or decreased by variably opening or closing, respectively, the control valve 124. In these embodiments, the bearing lubrication controller 116 may also be communicatively coupled to the control valve 124 in a similar manner to the pump 122.

Referring again to the bearing temperature control logic, the logic may further comprise detecting the fluid pressure from the pressure sensor 106 after increasing the rate of lubricant 118, receiving the fluid pressure from the pressure sensor 106, and determining whether the fluid pressure falls outside pre-defined bounds of the fluid pressure within the bearing 102. Similar to the temperature, the pre-defined bounds of the fluid pressure may comprise an upper pre-defined fluid pressure bound and a lower pre-defined fluid pressure bound. The pre-defined bounds of the pressure may themselves be determined according to the experience of personnel, lubrication system design, pressure ratings for the bearing 102, pressure ratings for the lines used in the system 100, operational safety, or combinations thereof.

Referring again to the bearing temperature control logic, the logic may further comprise increasing the speed of the exhaust fan 114 to a first speed upon determining the fluid pressure falls outside the upper pre-defined bound of the fluid pressure within the bearing 102.

Without being limited by theory, increasing the speed of the exhaust fan 114 may operate to increase a pressure differential along the lubricant drainage line 112 from the bearing 102 to the lubricant reservoir 108, thereby increasing drainage from the bearing 102. Without being limited by theory, the additional drainage from the bearing 102 may also increase circulation of the lubricant 118 within the bearing 102, contributing to increased cooling within the bearing 102.

Similarly, if the fluid pressure falls outside the lower pre-defined bound of the fluid pressure, the logic may further comprise decreasing the speed of the exhaust fan 114, as the additional load on the exhaust fan 114 may not be necessary to ensure adequate drainage and cooling of the bearing 102. If the fluid pressure falls inside the pre-defined bounds of the fluid pressure, one or more additional iterations of the logic occur wherein additional fluid pressures are detected and received before conducting the determining step in each subsequent iteration.

Without being limited by theory, it is contemplated that even with the maintaining of optimal bearing lubrication, cooling, and drainage, such as with the aforementioned system 100, the bearing 102 and the system 100 may still have a finite life of operation before necessary maintenance and replacement will be necessary. Accordingly the bearing temperature control logic may comprise additional logic to account for such a situation. Particularly, the logic may further comprise detecting a second temperature from the temperature sensor 104 a specified period of time after increasing the rate of the lubricant 118 supplied from the pump 122, receiving the second temperature from the temperature sensor 104, and determining whether the second temperature is greater than a first temperature. In this situation, the first temperature may be "the temperature" previously referred to hereinabove. Without being limited by theory, by including the previous additional steps in the logic, the controller may determine that additional increases in lubricant 118 flow rate are unlikely/unable to reduce the temperature in the bearing 102, which may be due to bearing wear. Accordingly, the logic may further comprise transmitting a request for bearing maintenance or replacement upon determining that the second temperature is greater than the first temperature.

Figure 2:
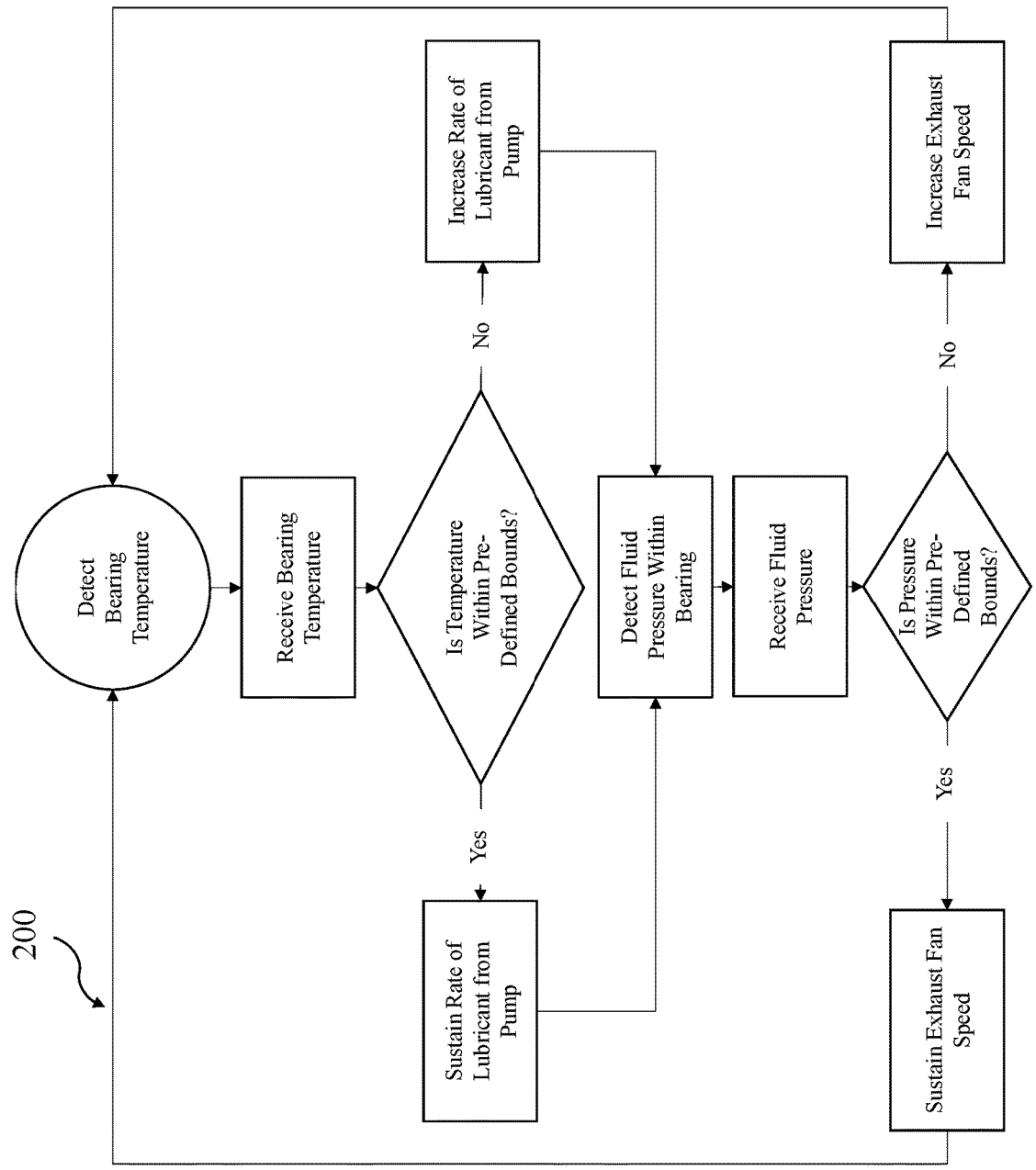
FIG. 2 illustrates a flowchart for bearing temperature control logic, according to embodiments herein.

Now referring to FIG. 2, and in embodiments, an illustration of a method 200 for bearing lubrication utilizing any of the systems 100 hereinbefore described and the bearing temperature control logic is shown. The method 200 may comprise the initial steps of detecting the temperature from the temperature sensor 104, receiving the temperature from the temperature sensor 104, and determining whether the temperature falls outside pre-defined bounds of the temperature.

The method 200 may further comprise, upon determining the temperature falls outside the pre-defined bounds of the temperature, increasing the rate of the lubricant 118 supplied from the pump 122 to the bearing 102. The method 200 may then further comprise detecting the fluid pressure from the pressure sensor 106 after increasing the rate of lubricant 118, receiving the fluid pressure from the pressure sensor 106, and determining whether the fluid pressure falls outside pre-defined bounds of the fluid pressure within the bearing 102. The method 200 may then comprise, upon determining the fluid pressure falls outside the pre-defined bounds of the fluid pressure within the bearing 102, increasing the speed of the exhaust fan 114 to increase a pressure differential along the lubricant drainage line 112 from the bearing 102 to the lubricant reservoir 108.

Figure 3:
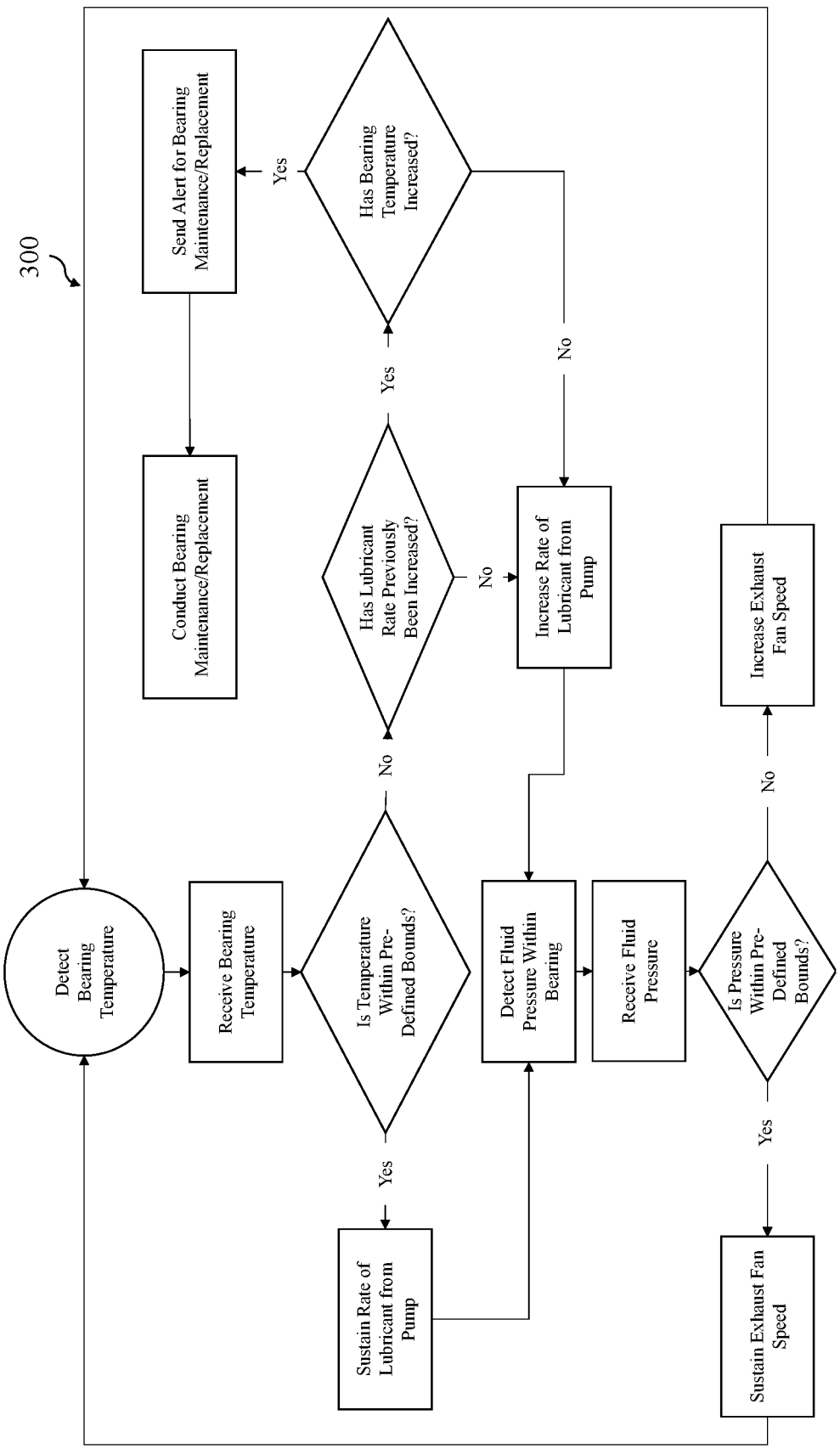
FIG. 3 illustrates another flowchart for bearing temperature control logic, according to embodiments herein.

Now referring to FIG. 3, and as previously stated, the logic may comprise one or more additional steps to determine if maintenance or replacement of the bearing 102 or a component of the system 100 is necessary. Accordingly, the process 300 illustrated in FIG. 3 may comprise the additional steps of detecting a second temperature from the temperature sensor 104 a specified period of time after increasing the rate of the lubricant 118 supplied from the pump 122, receiving the second temperature from the temperature sensor 104, determining whether the second temperature is greater than the first temperature, and transmitting a request for bearing maintenance or replacement upon determining that the second temperature is greater than the first temperature.

It is also noted that recitations herein of "at least one" component, element, etc., should not be used to create an inference that the alternative use of the articles "a" or "an" should be limited to a single component, element, etc.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purpose of describing the simplified schematic illustrations and descriptions of the relevant figures, the numerous valves, temperature sensors, micro controllers and the like that may be employed and well known to those of ordinary skill in the art of certain chemical processing operations may or may not be included. It should be understood that these components, when not illustrated, are within the spirit and scope of the present embodiments disclosed. Further, operational components, such as those described in the present disclosure, may be added to the embodiments described in this disclosure.

It should further be noted that arrows in the drawings refer to process streams. However, the arrows may equivalently refer to transfer lines, which may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows, which do not connect two or more system components, signify a product stream, which exits the depicted system, or a system inlet stream, which enters the depicted system. Product streams may be further processed in accompanying chemical processing systems or may be commercialized as end products.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

Furthermore, arrows with dashed lines in the drawings may indicate electronic communication between one or more system components, such as wired or wireless communications.

It should be understood that according to the embodiments presented in the relevant figures, an arrow between two system components may signify that the stream is not processed between the two system components. In other embodiments, the stream signified by the arrow may have substantially the same composition throughout its transport between the two system components. Additionally, it should be understood that in embodiments, an arrow may represent that at least 75 wt. %, at least 90 wt. %, at least 95 wt. %, at least 99 wt. %, at least 99.9 wt. %, or even wt. % of the stream is transported between the system components. As such, in embodiments, less than all of the stream signified by an arrow may be transported between the system components, such as if a slip stream is present.

It should be understood that two or more process streams are "mixed" or "combined" when two or more lines intersect in the schematic flow diagrams of the relevant figures. Mixing or combining may also include mixing by directly introducing both streams into a unit or other system component. For example, it should be understood that when two streams are depicted as being combined directly prior to entering a unit, that in embodiments the streams could equivalently be introduced into the unit or be mixed within the same. Alternatively, when two streams are depicted to independently enter a system component, they may in embodiments be mixed together before entering that system component.

It is noted that recitations herein of a component herein being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A system for bearing lubrication, comprising:
   a bearing;
   a temperature sensor configured to sense a temperature within the bearing;
   a pressure sensor configured to sense a fluid pressure within the bearing;
   a lubricant reservoir comprising a lubricant;
   a bearing lubrication line fluidly connected downstream from the lubricant reservoir and upstream from the bearing, the bearing lubrication line comprising a pump configured to supply the lubricant from the lubricant reservoir to the bearing along the bearing lubrication line;
   a lubricant drainage line fluidly connected downstream from the bearing and upstream from the lubricant reservoir, the lubricant drainage line configured to supply the lubricant from the bearing back to the lubricant reservoir along the lubricant drainage line;
   an exhaust fan fluidly connected to the lubricant reservoir, the exhaust fan configured to remove gaseous fluid from the lubricant reservoir; and
   a bearing lubrication controller communicatively coupled to the temperature sensor, the pressure sensor, the pump, and the exhaust fan, wherein the bearing lubrication controller is programmed to execute bearing temperature control logic comprising
      detecting the temperature from the temperature sensor,
      receiving the temperature from the temperature sensor,
      determining whether the temperature falls outside an upper pre-defined bound of the temperature,
      increasing the rate of the lubricant supplied from the pump to the bearing upon determining the temperature falls outside the upper pre-defined bound of the temperature,
      detecting the fluid pressure from the pressure sensor after increasing the rate of lubricant,
      receiving the fluid pressure from the pressure sensor,
      determining whether the fluid pressure falls outside an upper pre-defined bound of the fluid pressure within the bearing, and
      increasing the speed of the exhaust fan to increase a pressure differential along the lubricant drainage line from the bearing to the lubricant reservoir upon determining the fluid pressure falls outside the upper pre-defined bound of the fluid pressure within the bearing.

2. The system of claim 1, wherein the temperature is a first temperature and the bearing temperature control logic further comprises:
   detecting a second temperature from the temperature sensor a specified period of time after increasing the rate of the lubricant supplied from the pump;
   receiving the second temperature from the temperature sensor;
   determining whether the second temperature is greater than the first temperature;
   transmitting a request for bearing maintenance or replacement upon determining that the second temperature is greater than the first temperature.

3. The system of claim 1, wherein the bearing temperature control logic further comprises:
   determining whether the temperature falls outside a pre-defined lower bound of the temperature, and
   decreasing the rate of the lubricant supplied from the pump to the bearing upon determining the temperature falls outside the pre-defined lower bound of the temperature.

4. The system of claim 1, wherein the bearing temperature control logic further comprises:
   determining whether the fluid pressure falls outside a pre-defined lower bound of the fluid pressure within the bearing; and
   decreasing the speed of the exhaust fan upon determining the fluid pressure falls outside the pre-defined lower bound of the fluid pressure within the bearing.

5. The system of claim 1, wherein:
   the lubricant reservoir is at a lower elevation than the bearing; and
   the lubricant drainage line is configured to supply the lubricant from the bearing and back to the lubricant reservoir along the lubricant drainage line by gravity drainage.

6. The system of claim 1, wherein
   the bearing lubrication line further comprises a control valve positioned downstream of the pump and upstream of the bearing; and
   the rate of lubricant supplied from the pump is increased by variably opening the control valve.

7. The system of claim 6, further comprising a pressure release line fluidly coupled to the bearing lubrication line and the lubricant reservoir, wherein:
   the pressure release line is positioned downstream of the pump and upstream of the control valve; and
   the pressure release line comprises a check valve.

8. The system of claim 1, wherein the bearing further comprises an inboard seal and an outboard seal.

9. The system of claim 8, further comprising a compressed air source and an air supply line, wherein:
   the air supply line is fluidly connected downstream of the compressed air source and upstream of at least one of the inboard seal and the outboard seal, and
   the compressed air source is configured to supply compressed air to at least one of the inboard seal and the outboard seal to generate a positive pressure on at least the bearing.

10. The system of claim 9, further comprising an air vent line fluidly connected downstream of at least one of the inboard seal and the outboard seal and upstream of the compressed air source, the air vent line configured to vent the compressed air to the compressed air source along the air vent line.

11. The system of claim 8, further comprising a seal drainage line, wherein:
    the seal drainage line is fluidly coupled to and downstream from the inboard seal, the outboard seal, or both; and
    the seal drainage line is configured to supply the lubricant from the inboard seal, the outboard seal, or both to a disposal tank downstream of the seal drainage line.

12. The system of claim 11, wherein the seal drainage line further comprises a sight glass positioned upstream of the disposal tank.

13. The system of claim 1, further comprising a rotary member in contact with the bearing.

14. The system of claim 1, further comprising a rotary member in contact with the bearing, and wherein:
    the lubricant reservoir is at a lower elevation than the bearing;

the bearing lubrication line further comprises a control valve positioned downstream of the pump and upstream of the bearing; and the lubricant drainage line is configured to supply the lubricant from the bearing back to the lubricant reservoir along the lubricant drainage line by gravity drainage.

15. A process for bearing lubrication, wherein:

a temperature sensor and a pressure sensor are configured, respectively, to sense a temperature and a fluid pressure within a bearing;

an exhaust fan is fluidly connected to a lubricant reservoir and is configured to remove gaseous fluid from the lubricant reservoir;

a bearing lubrication line is fluidly connected downstream from the lubricant reservoir and upstream from the bearing, the bearing lubrication line comprising a pump configured to supply a lubricant from the lubricant reservoir to the bearing along the bearing lubrication line;

a lubricant drainage line is fluidly connected downstream from the bearing and upstream from the lubricant reservoir, the lubricant drainage line configured to supply the lubricant from the bearing back to the lubricant reservoir along the lubricant drainage line;

a bearing lubrication controller is communicatively coupled to the temperature sensor, the pressure sensor, the pump, and the exhaust fan and is programmed to execute a process utilizing bearing temperature control logic;

the process utilizing bearing temperature control logic comprises detecting the temperature from the temperature sensor, receiving the temperature from the temperature sensor, determining whether the temperature falls outside an upper pre-defined bound of the temperature, increasing the rate of the lubricant supplied from the pump to the bearing upon determining the temperature falls outside the upper pre-defined bound of the temperature, detecting the fluid pressure from the pressure sensor after increasing the rate of lubricant, receiving the fluid pressure from the pressure sensor, determining whether the fluid pressure falls outside an upper pre-defined bound of the fluid pressure within the bearing, and increasing the speed of the exhaust fan to increase a pressure differential along the lubricant drainage line from the bearing to the lubricant reservoir upon determining the fluid pressure falls outside the upper pre-defined bound of the fluid pressure within the bearing.

16. The process of claim 15, wherein the temperature is a first temperature and the process further comprises:

detecting a second temperature from the temperature sensor a specified period of time after increasing the rate of the lubricant supplied from the pump;

receiving the second temperature from the temperature sensor;

determining whether the second temperature is greater than the first temperature;

transmitting a request for bearing maintenance or replacement upon determining that the second temperature is greater than the first temperature.

17. The process of claim 15, wherein:

a rotary member is in contact with the bearing;

the lubricant reservoir is at a lower elevation than the bearing;

the lubricant drainage line is configured to supply the lubricant from the bearing and back to the lubricant reservoir along the lubricant drainage line by gravity drainage;

the bearing lubrication line further comprises a control valve positioned downstream of the pump and upstream of the bearing; and the rate of lubricant supplied from the pump is increased by variably opening the control valve.

18. The process of claim 15, wherein the process further comprises:

determining whether the temperature falls outside a pre-defined lower bound of the temperature; and decreasing the rate of the lubricant supplied from the pump to the bearing upon determining the temperature falls outside the pre-defined lower bound of the temperature.

19. The process of claim 15, wherein the process further comprises:

determining whether the fluid pressure falls outside a pre-defined lower bound of the fluid pressure within the bearing; and decreasing the speed of the exhaust fan upon determining the fluid pressure falls outside the pre-defined lower bound of the fluid pressure within the bearing.

20. The process of claim 15, further comprising a rotary member in contact with the bearing.

* * * * *